(12) United States Patent
Vallerius et al.

(10) Patent No.: US 11,874,528 B2
(45) Date of Patent: Jan. 16, 2024

(54) METHOD AND DEVICE FOR APPLYING AN OPTICAL MARK TO A SPECTACLE LENS

(71) Applicant: Carl Zeiss Vision International GmbH, Aalen (DE)

(72) Inventors: Ralf Vallerius, Oberkochen (DE); Elmar Rothe, Oberkochen (DE); Friedrich Pauker, Oberkochen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/356,457

(22) Filed: Jul. 21, 2023

(65) Prior Publication Data

US 2023/0359064 A1 Nov. 9, 2023

Related U.S. Application Data

(63) Continuation of application No. PCT/EP2022/054537, filed on Feb. 23, 2022.

(30) Foreign Application Priority Data

Feb. 26, 2021 (EP) ..................... 21159541

(51) Int. Cl.
*G02C 7/02* (2006.01)
*B24B 13/005* (2006.01)
(Continued)

(52) U.S. Cl.
CPC .......... *G02C 7/021* (2013.01); *B24B 13/0055* (2013.01); *B41M 3/003* (2013.01); *B41M 5/24* (2013.01); *G02B 27/32* (2013.01)

(58) Field of Classification Search
CPC .... G02C 7/021; G02B 27/32; B24B 13/0055; B41M 3/003; B41M 5/24
(Continued)

(56) References Cited

U.S. PATENT DOCUMENTS

2011/0157549 A1 6/2011 Wada et al.
2013/0000499 A1 1/2013 Ookubo et al.
2013/0335694 A1 12/2013 Huang et al.

FOREIGN PATENT DOCUMENTS

DE 10050263 A1 4/2002

OTHER PUBLICATIONS

Laramy-K homepage, available at the url: www.laramyk.com/resources/education/dispensing/boxing-system/ (last accessed May 27, 2022).
(Continued)

*Primary Examiner* — Wyatt A Stoffa
*Assistant Examiner* — Mitchell T Oestreich
(74) *Attorney, Agent, or Firm* — Tautz & Schuhmacher LLC; Georg M. Hasselmann (57) ABSTRACT

A method for applying an optical mark to a spectacle lens mounted in a spectacle frame includes determining an intended position of the optical mark at the spectacle lens based on the spectacle frame. The method further includes taking an image of at least a part of the spectacle frame and arranging the spectacle frame in a marking device having a marking appliance and adjusting the relative position of the spectacle frame and the marking appliance such that an actuation axis of the marking appliance intersects with the spectacle lens at the intended position of the optical mark. Additionally, the optical mark to the spectacle lens is applied at the intended position by using the marking appliance. The use of a spectacle frame as a positioning reference for an optical mark and a marking device are also disclosed.

21 Claims, 3 Drawing Sheets

(51) Int. Cl.
*B41M 5/24* (2006.01)
*B41M 3/00* (2006.01)
*G02B 27/32* (2006.01)

(58) Field of Classification Search
USPC .................................................. 351/159.69
See application file for complete search history.

(56) References Cited

OTHER PUBLICATIONS

Laramy-K Optical: Youtube video: "Optician Training—The Boxing System", available at www.youtube.com/watch?v=N7XqtoX118A, 2 sample slides provided, last accessed May 27, 2022.
Upgoal CNC Machinery: Youtube video: "Sunglasses Lens Logo Co2 RF Laser Marking Machine", available at www.youtube.com/watch?v=DzAtzUaMhNE, 2 sample slides provided, last accessed May 27, 2022.
European Search Report issued in EP 21 159 541.8, to which this application claims priority, dated Sep. 13, 2021.
International Search Report and Written Opinion issued in PCT/EP2022/054537, to which this application claims priority, dated Jun. 8, 2022.
International Preliminary Report on Patentability issued in PCT/EP2022/054537, to which this application claims priority, dated Jun. 21, 2023.
Intention to Grant (Communication under Rule 71 (3) EPC) issued in EP 22 707 178.4, which is a counterpart hereof, dated Oct. 23, 2023.

METHOD AND DEVICE FOR APPLYING AN OPTICAL MARK TO A SPECTACLE LENS

CROSS REFERENCE TO RELATED APPLICATIONS

This application is a continuation application of international patent application PCT/EP2022/054537, filed on Feb. 23, 2022 and designating the U.S., which claims priority to European patent application EP 21 159 541.8, filed on Feb. 26, 2021, both of which are hereby incorporated by reference in their entireties.

TECHNICAL FIELD

Exemplary embodiments of the disclosure relate to a method for applying an optical mark to a spectacle lens mounted in a spectacle frame, a use of a spectacle frame as a positioning reference, and a marking device. The disclosure is, thus, related, to the field of spectacle lenses and manufacturing processes of spectacle lenses.

BACKGROUND

Conventional spectacle lenses may exhibit optical marks, which offer assistance in aligning and processing the spectacle lens during the manufacturing process and/or the shaping process when cutting the spectacle lens to the right shape for being inserted into a spectacle frame. Such optical marks are known as orientation marks, which are typically engraved into the spectacle lens and in particular into the anti-reflective coating of the spectacle lens. Typically, all individual spectacle lenses, which are manufactured according to specific prescription data for a specific customer carry such orientation marks to allow a precise and reliable orientation and mounting of the spectacle lens in the intended spectacle frame. In addition, further optional permanent optical marks may be provided, which may provide information about the prescription data of the spectacle lens, such as its spherical power and/or cylindrical power and/or orientation of the cylinder axis and/or its prismatic power. These permanent engravings remain with the spectacle lens in the finalized spectacles. Since these permanent engravings are typically realized as laser-engravings into the anti-reflective coating of the spectacle lens, they do not significantly compromise the use of the spectacle lenses. Instead, such permanent markings are mainly visible when irradiating the spectacle lens with light under a predetermined angle and/or a specific wavelength, but they do not compromise the usability of the spectacle lens when worn by the customer. These permanent orientation marks may also be useful when determining the orientation of the spectacle lens in the spectacle frame after the spectacle lens has been mounted, which may facilitate replacing a damaged spectacle lens by a new spectacle lens having the same properties and in particular the same orientation in the spectacle frame. The orientation marks in general indicate the center point and, thus, the optical axis as well as an azimuthal axis, which may be relevant in particular for spectacle lenses having a cylindrical power. Orientation marks are generally applied according to international standards.

Moreover, further non-permanent optical marks are known in prior art, which may be used during the manufacturing process and/or the shaping process for shaping the spectacle lens to fit into the intended spectacle frame, but which may be removed from the spectacle lens after the manufacturing and shaping is completed. Such non-permanent marks may be used to indicate specific points of interest of the spectacle lens, such as the transmission points of the spectacle lens intended for far-vision and near-vision, respectively. For instance, such non-permanent optical marks may be applied by printing process.

In many cases it may be desirable to add further optical marks at specific positions at the spectacle lens. These specific positions can be identified relative to the permanent orientation marks, which indicate inter alia the center point of the spectacle lens. Therefore, when knowing the shaping data for shaping the spectacle lens according to the requirements for the intended spectacle frame, further optical marks may be applied at predetermined positions with respect to the spectacle frame already before shaping and mounting the spectacle lens into the spectacle frame. This positioning requires the permanent orientation marks as a positioning reference.

However, many spectacle lenses having a single and homogeneous refractive power are provided without the above-mentioned orientation marks. Such spectacle lenses do not necessarily require orientation marks, since their refractive power is independent of their orientation and the exact transmission point. Consequently, no precise positioning and orientation of such spectacle lenses is required for shaping and mounting the spectacle lenses. Accordingly, such spectacle lenses are often provided without orientation marks to avoid unnecessary manufacturing effort. The absence of orientation marks, however, prohibits the application of optical marks at predetermined positions with respect to the intended spectacle frame, since no orientation marks are available to be used as positioning reference.

US 2011/157549 A1 describes a vision shift amount measuring method including forming a reference mark indicating a distance eye point on a surface of a spectacle lens attached to a spectacle frame practically worn by a wearer. US 2013/000499 A1 describes a marking apparatus for spectacle lenses including a printing data generation device. DE 100 50 263 A1 describes a method for marking surfaces of optical elements using ultraviolet light. US 2013/335694 A1 describes personalized eye glasses having a texture area including text on the lens frame or lens.

The document Foba: "Software, Vision and Workflow Overview: High Performance Laser Marking Software with Laser Integrated Vision Alignment and Inspection Tools for the Simplest, Most Complete Laser Marking Process Solution" (10 Jan. 2019, retrieved from the URL h2b-laser.com/wp-content/uploads/2019/01/FOBA-SW-and-Vision-Overview_EN_12.18-3.pdf ) describes laser marking solutions including a camera system for positioning and aligning a marking.

The online document entitled: "Laser marking at a glance" by the Trumpf company (3 Dec. 2020, retrieved from the URL: www.trumpf.com/filestorage/TRUMPF_Master/Applications/Broschueres/TRUMPF-laser-marking-Booklet-EN_01.pdf) describes laser marking and engraving solutions.

SUMMARY

It is, thus, an objective technical problem of the disclosure to provide a method and a device allowing a reliable and independent application of an optical mark to a spectacle lens.

This problem is solved by a method, a use, and a marking device disclosed herein. Exemplary embodiments are presented in detail below.

A first embodiment of the disclosure relates to a method for applying an optical mark to a spectacle lens mounted in a spectacle frame. The method comprises determining an intended position of the optical mark at the spectacle lens based on the spectacle frame including taking an image of at least a part of the spectacle frame. The method further comprises arranging the spectacle frame in a marking device having a marking appliance and adjusting the relative position of the spectacle frame and the marking appliance such that an actuation axis of the marking appliance intersects with the spectacle lens at the intended position of the optical mark. Moreover, the method comprises applying the optical mark to the spectacle lens at the intended position by using the marking appliance.

A further embodiment of the disclosure relates to a use of a spectacle frame as a positioning reference for an optical mark to be applied to a spectacle lens mounted in the spectacle frame.

A further embodiment of the disclosure relates to a marking device for applying an optical mark to a spectacle lens mounted in a spectacle frame. The marking device comprises a support element for adjustably arranging the spectacle frame in the marking device, and an image capturing unit for taking an image of at least a part of the spectacle frame enclosing the spectacle lens. Moreover, the marking device comprises a marking appliance for applying the optical mark to the spectacle lens at a position intersecting with an actuation axis of the marking appliance. The marking device further comprises a control unit for determining an intended position of the optical mark at the spectacle lens based on the spectacle frame and for controlling the support element to arrange the spectacle frame such that the actuation axis of the marking appliance intersects with the spectacle lens at the intended position of the optical mark.

An optical mark is a mark provided in and/or at the spectacle lens, which may be visible for the human eye. Optionally the optical mark is adapted not to compromise the optical properties and the usability of the spectacle lens. The optical mark may be printed onto the spectacle lens. Alternatively or additionally, the optical mark may be engraved into the spectacle lens, in particular into an anti-reflective coating of the spectacle lens. Optionally, the optical mark is engraved into the anti-reflective coating such that a layer beneath the anti-reflective coating, such as a protective coating, is not altered by the engraved optical mark. The engraving may be applied by laser-engraving and/or mechanical engraving. The optical maker may also combine printed and engraved parts.

The intended position of the optical mark at the spectacle lens is a position, at which the application of the optical mark is desired. The intended position may be predetermined and based on technical requirements and/or standards and/or based on aesthetical and/or branding requirements.

Determining the intended position of the optical mark based on the spectacle frame means that the spectacle frame or parts of it are directly or indirectly used as a positioning reference. Directly using the spectacle frame as a positioning reference may involve determining the intended position at a predetermined position relative to a specific, identifiable mark of the spectacle frame, such as a corner and/or an edge of the spectacle frame. The spectacle frame within the meaning of this description does not necessarily comprise a physical frame, such as an element of metal and/or plastic material enclosing the spectacle lens. Instead, for so-called frameless spectacles the surrounding edge of the respective spectacle lenses may be regarded as the spectacle frame.

Arranging the spectacle frame in a marking device means that the spectacle frame is provided in the marking device to be processes by the marking device. The marking device does not necessarily need to enclose the spectacle frame. Instead, it may be sufficient for the marking device to support the spectacle frame allowing to fixate and adjust the position of the spectacle frame with respect to the marking appliance.

The actuation axis of the marking appliance is an axis, along which the actuation is carried out for applying the optical mark. This actuation axis may differ from any dimensional axis of the marking appliance. In case the marking appliance includes a laser-engraving device, the actuation axis may correspond to the optical axis of the laser beam used for laser-engraving. In this case, the actuation axis may be deflected, folded and/or bent. In case the marking appliance includes a printing device, the actuation axis may correspond to the center axis of the printing jet.

Exemplary embodiment of the disclosure provide the advantage that an optical mark may be applied to a spectacle lens independently of any other optical marks being available. In other words, exemplary embodiment of the disclosure allow applying an optical mark to a spectacle lens without the need of orientation marks as a positioning reference. This allows applying an optical mark also to such spectacle lenses having no orientation marks, such as spectacle lenses solely having a single and homogeneous spherical refractive power. Accordingly, exemplary embodiment of the disclosure allow applying an optical mark at a predetermined position to a large variety of spherical lenses, which do not exhibit orientation marks or any other marks offering a positioning reference. Thus, exemplary embodiment of the disclosure allow applying optical marks also to such spectacle lenses, which conventionally cannot be provided with an optical mark at a predetermined, intended position.

The disclosure further provides the advantage that an optical mark may be precisely applied at a predetermined position with respect to the spectacle frame. Since the optical mark is applied when the spectacle lens is mounted in the spectacle frame, the positioning and/or orientation and/or determination of the size of the logo may be determined with respect to the spectacle frame. This provides an advantage over conventional methods, according to which the application of optical marks, such as orientation marks, is carried out during the manufacturing process when the shaping data for the intended spectacle frame may not yet be available.

Furthermore, the disclosure provides the advantage that information and/or branding and/or individualization may be added to the spectacle lens after the spectacle lens has been mounted into the spectacle frame. An optical mark may for instance be a symbol, a number and/or a text element carrying information, in particular information about the spectacle lens, the manufacturer and/or the customer of the spectacle lens. For example, the optical mark may indicate the refractive power and/or a spherical and/or cylindrical and/or prismatic power and/or an orientation of a cylinder axis. As another example, the optical mark may indicate the manufacturer and/or a manufacturing number and/or a manufacturing date. Yet another example may be an optical mark indicating a logo of the manufacturer and/or a logo of a product for branding the spectacle lens and the resulting spectacle and/or for preventing or impeding plagiarism. Thus, the disclosure offers a large variety of options for branding and/or individualizing the spectacle lens and/or for protecting it against fraudulent plagiarism.

According to an optional embodiment, the method further comprises adjusting the relative orientation of the spectacle lens and the marking appliance such that a surface normal of the spectacle lens at the intended position of optical mark overlaps with the actuation axis of the marking appliance prior to applying the mark to the spectacle lens. The surface normal of the spectacle lens at the intended position of optical mark overlapping with the actuation axis means that the actuation axis is perpendicular to the tangent of the surface of the spectacle lens intersected by the actuation axis. This allows ensuring that the marking appliance is perpendicular directed towards the intended position of the spectacle lens. This bears the benefit that for spectacle lenses having a spherical front surface the curvature of the front surface of the spectacle lens is curved concentrically with the position, at which the actuation axis intersects the front surface of the spectacle lens. Accordingly, the depth profile of the front surface of the spectacle lens alters concentrically around the actuation axis. Therefore, asymmetries of the applied optical mark arising from a possibly asymmetric depth profile of the front surface of the spectacle lens may be avoided. In particular when using a focused laser beam for laser-engraving the optical mark, a symmetrical depth profile around the actuation axis may be particularly advantageous to avoid parts of the intended position of the optical mark being arranged outside a predetermined focal depth and therefore outside the region, in which the intensity is sufficient for the laser-engraving process. In case of a printer, which may have a divergent printing beam, avoiding such an asymmetry may be beneficial to ensure an even distribution of printing pigments. The same applies, mutatis mutandis, for the back surface of the spectacle lens when the back surface of the spectacle lens faces the marking appliance for applying an optical mark to the back surface.

According to an optional embodiment, the method further comprises positioning the spectacle frame and the marking appliance relative to each other prior to applying the mark to the spectacle lens such that the intended position of the optical mark and the marking appliance are arranged at a predetermined distance along the actuation axis from each other. The distance may relate to the distance of the marking appliance from the surface of spectacle lens facing the marking appliance. This allows a precise application of the optical mark to the spectacle lens. In particular, when applying the optical mark by laser-engraving using a focused laser beam, the precise control of the distance may be advantageous to ensure that the surface of the spectacle lens, to which the optical mark is to be applied, is located within the focal depth. This may be detrimental for the laser beam having a sufficiently high intensity to carry out the laser-engraving process. Similarly, also when using a printer for applying the optical mark, the distance may be essential for achieving the intended printing resolution and pigment density.

Determining the intended position of the optical mark based on the spectacle frame includes taking an image of at least a part of the spectacle frame. Based on the image the position of the spectacle frame may be determined and the intended position of the optical mark at the spectacle lens may be determined relative to the position of the spectacle frame. Determining the intended position of the optical mark may be carried out in a partly or fully automated manner or manually by the operator. For instance, the intended position of the optical mark may be determined based on the image to be located at a predetermined distance of the interface between the edge of the spectacle frame and the spectacle lens. For instance, a corner of the spectacle frame may be chosen as a positioning reference to achieve a positioning in two dimensions. Optionally, one or more of the following parameters are determined based on the image: a box dimension of the spectacle frame enclosing the mounted spectacle lens; a center point of the spectacle lens mounted in the spectacle frame. These determined parameters may facilitate an automated determination of the optical mark with respect to the spectacle frame. The automatedly determined intended position of the optical mark may be automatedly set by the marking device for the application of the optical mark or may be suggested by the marking device to the operator for approval or modification.

Determining the intended position of the optical mark is optionally carried out in an automated manner based on the image of at least a part of the spectacle frame. Determining the intended position of the optical mark may further be based on one or more of the following parameters: the box dimension of the spectacle frame enclosing the mounted spectacle lens; the center point of the spectacle lens mounted in the spectacle frame. These parameters may facilitate the process of determining the intended position of the optical mark, in particular when carried out in an automated manner. The box dimension of the spectacle frame is a virtual rectangle enclosing the spectacle lens mounted in the spectacle frame. Each side of the virtual box touches the point of the spectacle frame furthest out at the respective side of the spectacle lens. Alternatively or additionally, outer box dimensions of the spectacle frame may be determined and used. For instance, the box dimensions of the spectacle frame may facilitate determining the center point of the spectacle lens and/or other areas of the spectacle lens, such as areas associated with a specific corner of the spectacle lens. In other words, these parameters may facilitate the automated orientation for determining the intended position of the optical mark.

According to an optional embodiment, the method further comprises applying a second optical mark to a second spectacle lens mounted in the spectacle frame. The second optical mark may be identical to or different from the optical mark applied to the first spectacle lens may be applied. The position of the second optical mark may correspond to or deviate from the position of the first optical mark with respect to the first spectacle lens. For instance, the second optical mark may be applied at a position of the second spectacle lens such that a symmetry between the two optical marks is established with regard to a central axis and/or a central point of the spectacle frame. This bears the advantage that both spectacle lenses mounted in a spectacle frame may be each provided with one or more optical marks in one single process.

According to an optional embodiment, applying the second optical mark to the second spectacle lens mounted in the spectacle frame comprises determining an intended position of the second optical mark at the second spectacle lens based on the spectacle frame, and adjusting the relative position of the spectacle frame and the marking appliance such that an actuation axis of the marking appliance intersects with the second spectacle lens at the intended position of the second optical mark. The method according to this optional embodiment further comprises applying the second optical mark to the second spectacle lens at the intended position of the second optical mark by using the marking appliance. In other words, the method may comprise repositioning the spectacle frame and/or the marking appliance such that the actuation axis of the marking appliance is transferred from the first spectacle lens to the second spectacle lens, i.e. that the actuation axis intersects with the second spectacle lens.

The process of determining the intended position of the second optical mark may then be similar or identical to the respective process applied for determining the intended position and applying the first optical mark. This alternative embodiment provides the advantage that a second optical mark may be applied to the second spectacle lens in a precise and reliable manner.

Optionally the method further comprises determining one or more of the following parameters: a center axis of the spectacle frame, and a center point of the spectacle frame. These parameters characterize the spectacle frame and may be used for a manual or an automated orientation with respect to the whole spectacle frame. These parameters may be particularly beneficial for determining the intended position of the second optical mark. Thus, according to an optional embodiment, determining the intended position of the second optical mark at the second spectacle lens may be based on the actual and/or intended position of the first optical mark at the first spectacle lens and the one or more determined parameters. This may facilitate to manually and/or automatedly adjust the position of the second optical mark to the position of the first optical mark. In particular, this may facilitate establishing a symmetry of the first and second optical mark with respect to the center line of the spectacle frame.

According to an optional embodiment, applying the optical mark includes one or more of the following application steps: laser-engraving at least a part of the optical mark into the spectacle lens; mechanically engraving at least a part of the optical mark into the spectacle lens; printing at least a part of the optical mark onto the spectacle lens. Laser engraving may be performer using a continuous wave and/or a pulsed laser source. For instance, a femtosecond laser source may be used. Laser-engraving may comprise locally ablating one or more layers of the spectacle lens, in particular at the front surface of the spectacle lens. For example, laser-engraving may include a local ablation of at least a part of an anti-reflective coating applied to the front surface of the spectacle lens. Laser-engraving the optical mark may optionally be carried out such that layers or the substrate of the spectacle lens underneath the ablated anti-reflective coating remain unchanged. The same may apply, mutatis mutandis, for mechanically engraving the optical mark. Printing the optical mark or at least a part of it to the spectacle lens may include locally applying printing pigments onto the spectacle lens. The applied printing pigments may locally alter the transparency and/or reflectivity of the spectacle lens and may, thus, be distinguished from the surrounding parts of the spectacle lens. The printed optical mark may be of one or several colors. According to an optional embodiment, an optical mark may include at least one part engraved and a second part printed onto the spectacle lens.

It is emphasized that applying the optical mark to a spectacle lens may be carried out to a surface of the optical mark facing the marking appliance. This surface may be the front surface or the back surface of the respective spectacle lens. Which surface of the spectacle lens facing the marking appliance may be selected by providing the spectacle frame in the marking device with the respective orientation. When using laser-engraving for applying the optical mark, the optical mark may alternatively or additionally be applied to the surface of the spectacle lens facing away from the mounting appliance. This may be achieved by adjusting the focal position of the engraving laser at the surface of the spectacle lens facing away from the mounting appliance.

The marking device further comprises an image capturing unit for taking an image of at least a part of the spectacle frame enclosing the spectacle lens. The image capturing unit may comprise or consist of a camera, such as a digital camera. The spectacle frame may be imaged and recorded by the image capturing unit. The image taken by the image capturing unit may then be evaluated for identifying the spectacle frame and/or one or more spectacle lenses mounted in the spectacle frame and/or for determining the intended position(s) of one or more optical marks to be applied to one or more spectacle lenses. The image taken by the image capturing unit may cover the whole spectacle frame or only a part of it. According to an optional embodiment only such a part of the spectacle frame is captured by the image capturing unit, which encloses one spectacle lens and optionally an area of the spectacle frame, in which the center line and/or center point of the spectacle frame is located. For capturing an image, the relative position of the spectacle frame with respect to the image capturing system and optionally the marking appliance may be changed. For instance, the spectacle frame may be moved with respect to the image capturing unit and/or vice versa. According to another optional embodiment, the image capturing unit may be adapted to capture an image of the entire spectacle frame or at least of those parts of the spectacle frame enclosing both spectacle lenses mounted in the spectacle frame. This may render a relative movement between the spectacle frame and the image capturing unit obsolete.

According to an optional embodiment, the control unit is configured to automatedly determine the intended position of the optical mark at the spectacle lens based on the image of at least a part of the spectacle frame taken by the image capturing unit. In other words, the image taken by the image capturing unit is provided to a control unit, which then may determine the intended position of the optical mark at the spectacle lens based on the provided image. This may be carried out in an automated manner by the control unit. However, according to another optional embodiment, the image may be displayed to an operator, for instance via a display unit, for manually determining the intended position of the optical mark.

According to an optional embodiment, the marking device comprises an alignment light source for emitting an alignment beam for adjusting the relative position and optionally a relative orientation of the spectacle frame and the marking appliance. For instance, the reflection of at least a part of the alignment beam off the surface of the spectacle lens facing the alignment light source may be used for alignment purposes. For example, the position of the reflection at the spectacle lens may indicate the position, at which the actuation axis intersects with the spectacle lens. Alternatively or additionally, the direction of the alignment beam's reflection off the spectacle lens may be used to determine and/or adjust an orientation of the surface of the spectacle lens facing the alignment light source. According to an optional embodiment, adjusting the orientation of the spectacle lens may include adjusting the spectacle lens such that the reflection of the alignment beam overlaps the impinging alignment beam. By this, it may be achieved that the surface normal of the intended position of the optical mark at the spectacle lens overlaps with the optical axis of the alignment light source, which may be identical with the actuation axis.

The marking appliance is or comprises means for applying the marking to the spectacle lens. The marking appliance may be regarded as a marking actuator. The terms "marking actuator" and "marking appliance" may be used as synonyms throughout the disclosure. The marking appliance may comprise mechanical and/or non-mechanical means for applying the marking to the spectacle lens. According to an optional embodiment, the marking appliance comprises at least one of the following elements: a laser for laser-engraving, a mechanical actuator for mechanical engraving, a printer unit. This provides the marking device with the functionality to apply the one or more optical marks by laser-engraving, mechanically engraving and/or printing.

According to an optional embodiment, the step of determining the intended position of the second optical mark at the second spectacle lens based on the spectacle frame includes taking an image of at least a part of the first spectacle lens including the intended and/or actual position of the first optical mark at the first spectacle lens and of at least a part of the spectacle frame surrounding the first spectacle lens and using the image for determining the intended position of the second optical mark. In other words, an image of the first spectacle lens and the surrounding spectacle frame or parts of it may be taken, such that the position of the first optical mark at the first spectacle lens with respect to the spectacle frame can be determined. This retrieved information about the position of the first optical mark is then used for determining the intended position of the second optical mark at the second spectacle lens with respect to the spectacle frame. This allows ensuring that the first and second optical marks are positioned in a symmetric and/or equivalent manner with respect to the spectacle frame. This method may for instance include providing a mirror image of the image taken of the first optical mark and using the mirror image for determining the intended position of the second optical mark. For instance, the part of the spectacle frame included in the mirror image may be brought to an at least partial virtual overlap with the corresponding part of the spectacle frame surrounding the second spectacle lens. The intended position of the second optical mark with respect to the spectral frame surrounding the second spectacle lens may then be determined as corresponding to the virtual position of the first optical mark with reference to the virtual representation of the spectacle frame in the mirror image.

It is understood by a person skilled in the art that the above-described features and the features in the following description and figures are not only disclosed in the explicitly disclosed exemplary embodiment and combinations, but that also other technically feasible combinations as well as the isolated features are comprised by the disclosure of the disclosure. In the following, several exemplary embodiment of the disclosure and specific examples of the disclosure are described with reference to the figures for illustrating the disclosure without limiting the disclosure to the described exemplary embodiment.

BRIEF DESCRIPTION OF THE DRAWINGS

The disclosure will now be described with reference to the drawings wherein.

DESCRIPTION OF EXEMPLARY EMBODIMENTS

In the drawings the same reference signs are used for corresponding or similar features in different drawings.

Figure 1:
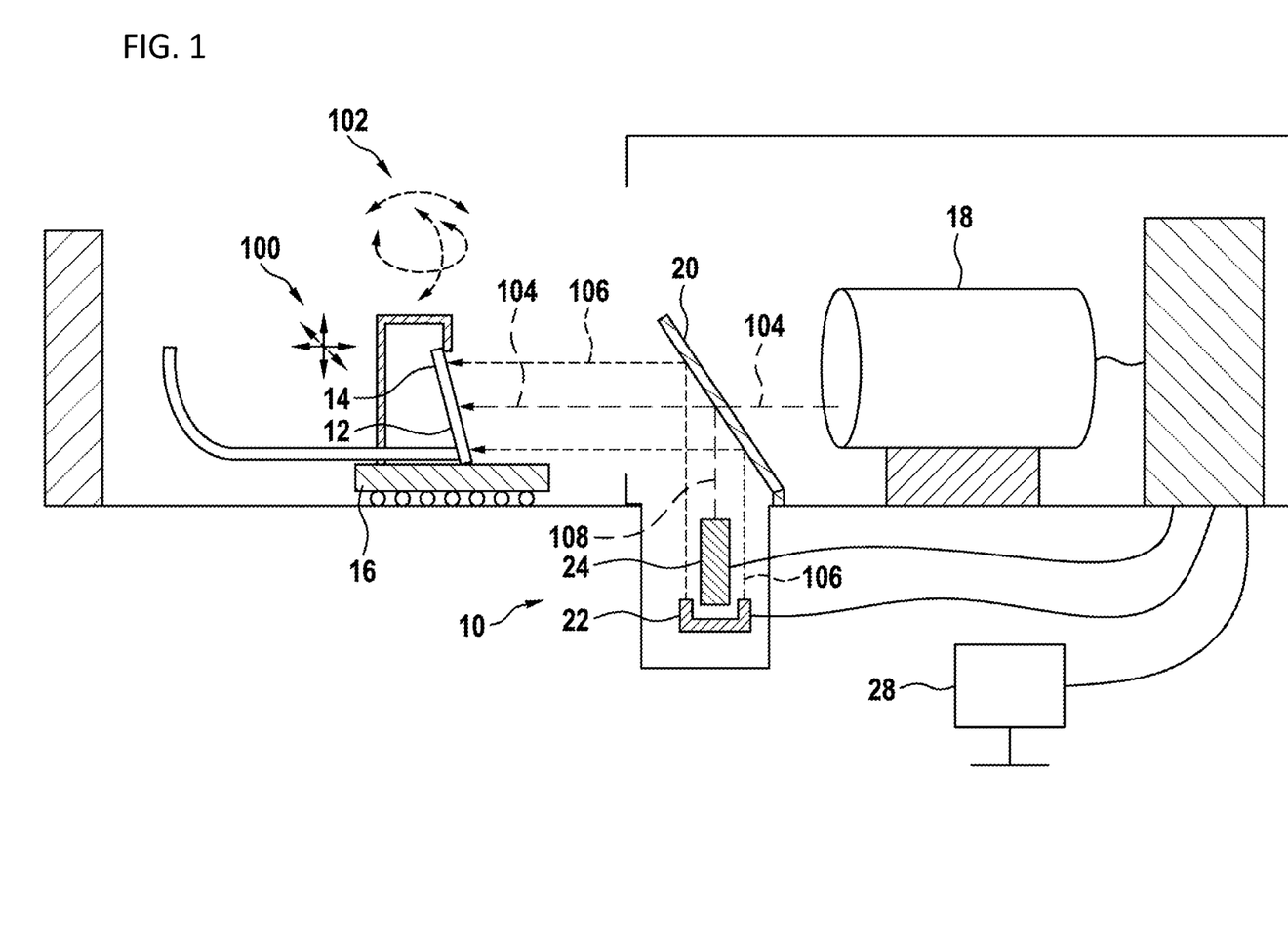
FIG. 1 shows a marking device for applying an optical mark to a spectacle lens mounted in a spectacle frame according to an optional embodiment.

FIG. 1 schematically depicts a marking device 10 for applying an optical mark to a spectacle lens 12 mounted in a spectacle frame 14 according to an optional embodiment in a cross-sectional view. The marking device 10 comprises a support element 16 for receiving and supporting the spectacle frame 14 in the marking device 10, wherein the spectacle frame has mounted one or more spectacle lenses 12. The support element 16 is adapted to adjust the position and orientation of the spectacle frame 14 with respect to the marking device 10. According to the presented embodiment, the support element 16 is able to adjust the position of the spectacle frame 14 in all three spatial dimensions, as indicated by arrows 100, and to adjust the orientation with respect to the marking device 10 via rotational movements around all three axes of the spatial dimensions, as indicated by arrows 102. However, according to other exemplary embodiment the support element 16 may be adjustable only along one or two dimensions and/or around one or two axes of the spatial dimensions.

The marking device 10 further comprises a marking appliance 18 for applying the optical mark to the spectacle lens 12. The marking appliance 18 acts onto the spectacle lens 12 along an actuation axis 104, which may be folded and/or deflected by one or more optical elements. According to the presented embodiment, the actuation axis 104 extends straight towards the spectacle lens 12. According to the presented embodiment a mirror 20 is arranged between the marking appliance 18 and the spectacle frame 14 for alignment purposes, which may be removed from the actuation axis 104 after the alignment process is completed in order not to block the marking appliance 18. The marking appliance 18 is adapted as a laser-engraving device, which emits a laser beam for engraving the optical mark into the spectacle lens. The marking appliance 18 may for instance include a pulsed laser source for providing the laser-engraving beam. The laser-engraving beam may be focused to the spectacle lens 12.

Other exemplary embodiment may use a printer element as a marking appliance 18 for printing the optical mark onto the spectacle lens 12. Such exemplary embodiment may require a straight and undeflected actuation axis 104 to ensure the printing pigments arriving at the spectacle lens 12.

The marking device 10 further comprises an alignment light source 22 for emitting an alignment beam 106. The alignment beam 106 propagates towards the mirror 20 and is reflected to propagate parallel to the actuation axis 104 after reflecting off the mirror 20. The alignment light source 22 according to the presented embodiment is a ring-shaped light source arranged around an image capturing unit 24. This allows providing the alignment light beam 106 emitted by the alignment light source 22 and capturing an image of the spectacle lens 12 along an image capturing axis 108 concentrically to each other and concentrically with the actuation axis 104 (after the reflection off the mirror 20). For example, the alignment light source 22 may comprise several LEDs in a ring-shaped arrangement around the actuation axis 104. The alignment beam 106 emitted by the alignment light source 22 may be imaged to the spectacle lens 12.

Moreover, the image capturing unit 24 is arranged in the marking device 10, such that the inserted spectacle frame 14 is fully or partly arranged in the field of view of the image capturing unit 24. According to the presented embodiment, the mirror 20 is arranged between the image capturing device 24 and the spectacle frame 14. After the alignment process using the alignment light source 22 and the image capturing unit 24 is completed, the mirror 20 may be rearranged or removed such as not to intersect with the actuation axis 104. For instance, the image capturing unit 24 unit may be a digital camera or comprise such.

In addition, the marking device 10 comprises a control unit 26. The control unit 26 is configured to determine the intended position of the optical mark to be applied to the spectacle lens 12 based on the spectacle frame 14. This determination is carried out based on the image(s) taken by the image capturing unit 24, which are provided to the control unit 26. The determination of the intended position may be carried out in an automated manner by the control unit according to predetermined instructions or may be carried out by an operator. At least in the latter case, the image taken b the image capturing unit 24 may be displayed via a display unit 28 to an operator for determining the intended position. The predetermined instructions for determining the intended position of the optical mark at the spectacle lens 12 may be provided as a relative position or range of positions of the optical mark with respect to the spectacle frame 14 or an identifiable part of the spectacle frame 14. For instance, the predetermined instructions may define a certain distance from a specific corner and/or a side part and/or an upper part of the spectacle frame 14. Furthermore, an intended orientation of the optical mark with respect to the spectacle lens 12 and/or the spectacle frame 14 may be determined. For instance, an upper side of the spectacle frame 14 and/or a surface of the support element 16, onto which the upper side of the spectacle frame 14 is placed, may be used as an orientation reference, to which the optical mark is oriented in a parallel manner or under a predetermined angle.

The control unit 26 is further configured to control the support element 16 to arrange the spectacle frame 14 such that the actuation axis 104 of the marking appliance 18 intersects with the spectacle lens 12 at the intended position of the optical mark. The alignment beam and its reflection off the spectacle lens 12 may be used for orientation. The control of the support element 16 may be automatedly carried out by the control unit 26 and/or may be manually carried out by the operator. The marking device 10 may have a command input device, such as control knobs and/or or a control stick, allowing the operator to manually control the support element 16. The marking device 10 may be configured to combine an automated and manual determination of the intended position of the optical mark. For instance, the control unit 26 may automatedly determine the intended position of the optical mark based on and with reference to the spectacle frame 14 and control the support element 16 to bring the spectacle frame into a position and optionally into an orientation that the actuation axis 104 intersects with the intended position of the optical mark at the spectacle lens 12. The marking device 10 may then suggest the automatedly determined intended position of the optical mark to the operator, who may confirm the intended position for applying the optical mark and/or may carry out fine adjustments to the suggested intended position or may discard the suggested intended position and manually determine the intended position.

When the intended position is set and/or confirmed, the marking appliance 18 may apply the optical mark to the spectacle lens 12 at the intended position. According to the presented embodiment, a laser-engraving beam is emitted and focused to the intended position to engrave the optical mark into the spectacle lens. Optionally the marking device 10 may be configured to automatedly remove the mirror 20 prior to applying the optical mark to the spectacle lens 12.

Afterwards, the process may continue with applying a further mark to the same spectacle lens at a further intended position. Alternatively or additionally, the marking device may rearrange the spectacle frame 14 to a different position and determine an intended position for a second optical mark to be applied to the intended position at the second spectacle lens mounted in the spectacle frame. For instance, a center axis of the spectacle frame 14 may have been automatedly determined by the control unit 26 and may be used for determining the intended position of the second optical mark at the second spectacle lens 12. For example, the control unit 26 may be configured to move the spectacle frame 14 using the support element 16 twice the determined horizontal distance of the position of the applied first optical mark from the center axis of the spectacle frame 14. This might result in the actuation axis 104 being in or close to the intended position of the second optical mark, which may be applied at an intended position being symmetrical to the position of the first optical mark when mirrored at the center axis of the spectacle frame 14. Optionally, a process for determining the intended position of the second optical mark based on the spectacle frame 14 and for applying the second optical mark may be carried out similar or identical to the previous application of the first optical mark. For this purpose, the mirror 20 may be automatically reinserted to reflect the alignment light beam 106 and deflect the image capturing axis 108.

Figure 2:
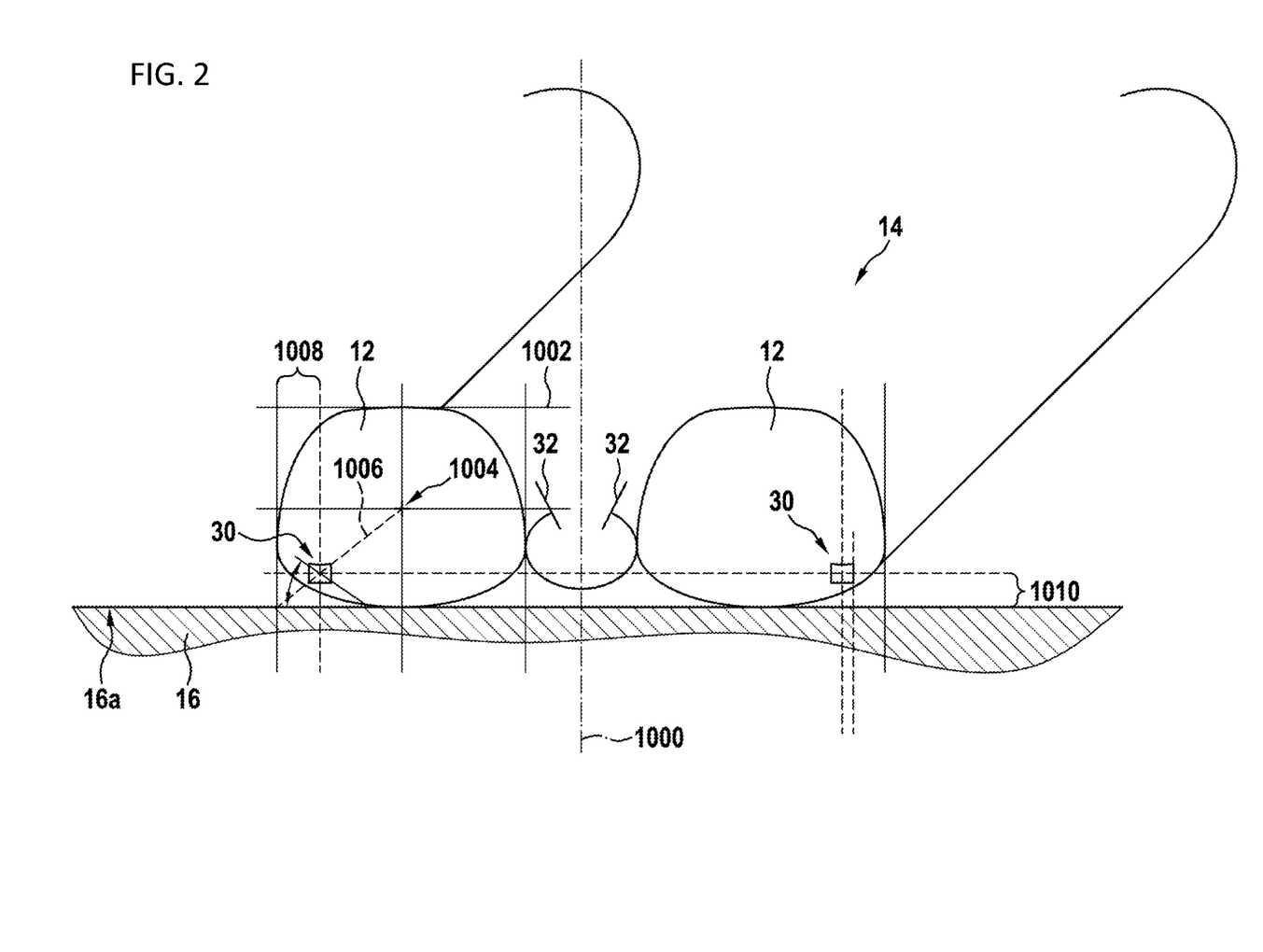
FIG. 2 shows several dimensions and parameters for determining the intended position of an optical mark to a spectacle lens mounted in a spectacle frame.

FIG. 2 exemplarily indicates several dimensions and parameters for determining the intended position of an optical mark 30 to a spectacle lens 12 mounted in a spectacle frame 14. FIG. 2 shows in schematic drawing a spectacle frame 14 having two spectacle lenses 12 mounted in the spectacle frame 14. An optical mark 30 is applied to each spectacle lens 12, respectively, which represented a logo of the manufacturer of the spectacle lenses 12. The spectacle frame 14 is arranged lying with its upper side onto an upper surface 16*a* of the support element 16. Therefore, the upper surface 16 may serve as a reference position indicating the upper edge of the spectacle frame 14.

As can be seen in FIG. 2, the center axis 1000 of the spectacle frame 14 is indicated, which extends perpendicular to the upper edge of the spectacle frame 14 between the nose pads 32 of the spectacle frame 14. Furthermore, the box dimensions 1002 of one of the spectacle lenses 12 are indicated and the respective center point 1004, which can be retrieved from the box dimensions 1002. In addition, a diagonal line 1006 may be retrieved from the box dimensions 1002 allowing to define a corner of the spectacle lens 14 with respect to the spectacle frame 14.

Instructions for determining the intended position of the optical mark 30 based on the spectacle frame may include setting a distance of the center or edge of the optical mark 30 from a sideline and/or bottom line and/or upper line of the box dimensions. For example, the instructions may define the distance 1008 of the optical mark from the sideline and/or the distance 1010 of the optical mark from the upper line. For instance, the distances 1008 and 1010 may be set to 4 mm for determining the intended position of the optical mark 30 at the spectacle lens with respect to the spectacle frame 14.

Figure 3A:
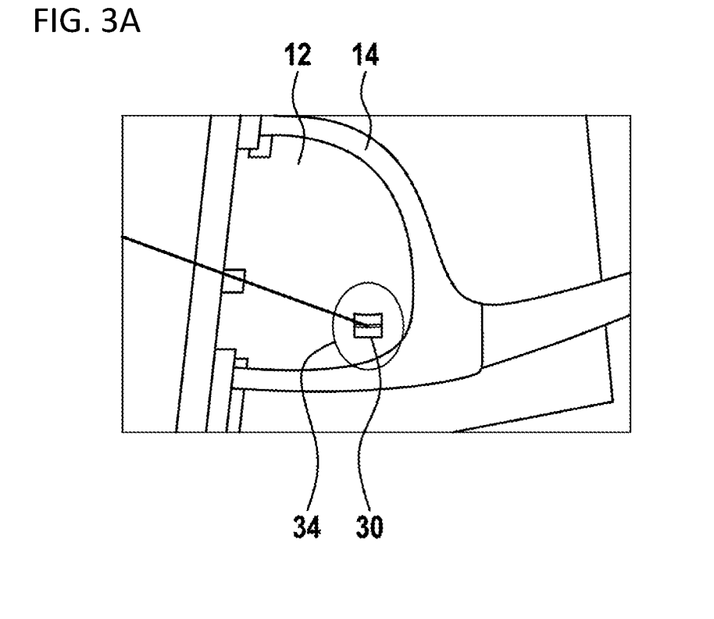
FIGS. 3A and 3B shown exemplarily illustration of steps for determining the intended position of an optical mark at a spectacle lens with respect to the spectacle frame.
Figure 3B:
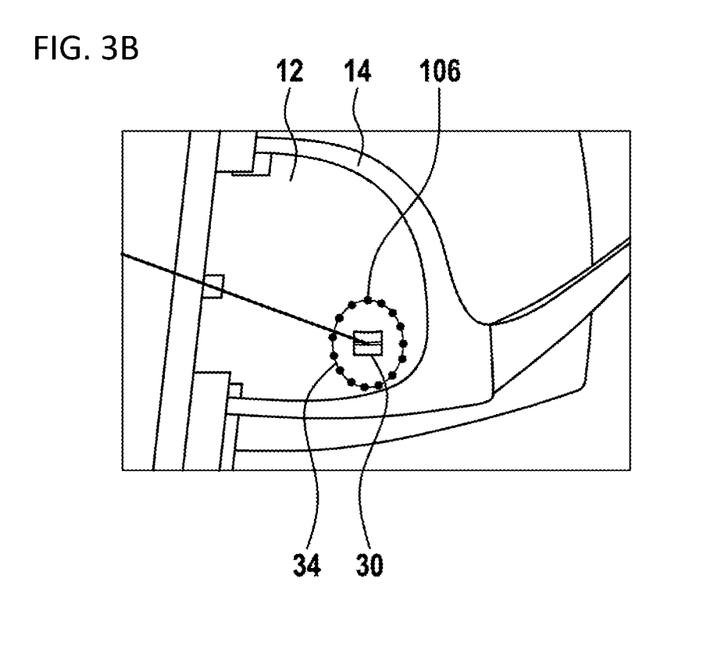

FIGS. 3A and 3B exemplarily illustrate steps for determining the intended position of an optical mark 30 at a spectacle lens 12 with respect to the spectacle frame 14. The presented images are images taken by an image capturing unit 24, as discussed with reference to FIG. 1. For automatedly and/or manually determining the intended position of the optical mark 30 a virtual indicator 34 may be displayed together with the taken image (FIG. 3A), which is presented as a thin circle line. The center of the virtual indicator 34 may correspond to the intersection point of the actuation axis 104 with the spectacle lens 12. In addition, a virtual representation of the optical mark 30 may be displayed to visualize the optical mark 30 placed at the currently chosen intended position. The control unit and/or the operator may then control the support element 16 to change the position of the spectacle frame 14 and by this to adjust the intended position of the optical mark 30 to satisfy the predetermined conditions and/or instructions. The image taken by the image capturing unit 24 may be regularly or permanently updated to allow tracking the changes when moving the spectacle frame 14 relative to the image capturing unit 24 and the actuation axis 104. Thus, the image presented in FIG. 3A corresponds to an overlay of the taken image, the virtual indicator 34 and a virtual representation of the optical mark 30 to be applied.

When the intended position of the optical mark 30 is set, the marking device 10 may automatedly adjust the orientation of the spectacle lens 12 relative to the actuation axis 104 or assist the operator to perform this task. According to this embodiment, the front surface of the spectacle lens 12 is to be oriented in a manner that the surface normal at the intersection of the actuation axis 104 with the front surface of the spectacle lens 12 overlaps with the actuation axis 104. In other words, the spectacle frame 14 is adjusted such that the actuation axis 104 is perpendicular to the front surface of the spectacle lens 12 at their intersection. For achieving this orientation alignment, the alignment beam 106 is used, whose reflection off the front surface of the spectacle lens 12 can be seen in the image. This circle of dots is emitted by the alignment light source 22. The optimal orientation may be achieved by adjusting the orientation of the spectacle frame 14 until the reflection of the alignment beam 106 overlaps with the virtual indicator 34. This may correspond to an orientation of the spectacle lens 12, in which the reflection of the alignment beam 106 is concentrical to the incoming alignment beam, which is the case when the alignment beam 106 is perpendicular to the front surface of the spectacle lens 12. Thus, by ensuring that the alignment beam 106 propagates along the actuation axis 104, a suitable alignment may be achieved.

According to an optional embodiment, the method may further comprise an adjustment of the distance between the marking appliance 18 and the intended position of the optical mark 30. This may be particularly important when using a focused laser-engraving beam, since the laser-engraving may work best when the intended position of the optical mark 30 at the spectacle lens 12 is located within the focal depth, which may be a range of only few millimeters. Adjusting this distance may for instance be controlled by using a mechanical spacer and/or a mechanical feeler (not shown). This may allow determining the spectacle lens 12 having a suitable distance from the marking appliance 18 when the spectacle lens gets in contact with the mechanical spacer and/or mechanical feeler.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

10 marking device
12 spectacle lens
14 spectacle frame
16 support element
18 marking appliance
20 mirror
22 alignment light source
24 image capturing unit
26 control unit
28 display unit
30 optical mark
32 nose pad
34 virtual indicator
100 arrows indicating adjustability in spatial dimensions
102 arrows indicating rotational adjustability
104 actuation axis
106 alignment beam
108 image capturing axis
1000 center axis of spectacle frame
1002 box dimension of spectacle lens
1004 center point of spectacle lens
1006 diagonal line of box dimensions
1008 distance between optical mark and side line of box dimension
1010 distance between optical mark and upper line of box dimension

The invention claimed is:

1. A method for applying a first optical mark to a first spectacle lens and a second optical mark to a second spectacle lens mounted in a spectacle frame, the method comprising:
   capturing an image of at least such parts of the spectacle frame enclosing the first spectacle lens and the second spectacle lens mounted in the spectacle frame with an image capturing unit;
   determining an intended position of the first optical mark at the first spectacle lens based on the spectacle frame including evaluating the image captured by the image capturing unit;
   arranging the spectacle frame in a marking device having a marking appliance and adjusting a relative position of the spectacle frame and the marking appliance such that an actuation axis of the marking appliance intersects with the first spectacle lens at the intended position of the first optical mark;
   applying the first optical mark to the spectacle lens at the intended position by using the marking appliance;

determining one or more of the following parameters: a center axis of the spectacle frame and a center point of the spectacle frame;

applying the second optical mark to the second spectacle lens mounted in the spectacle frame, wherein applying the second optical mark to the second spectacle lens mounted in the spectacle frame includes:

determining an intended position of the second optical mark at the second spectacle lens based on the position of the first optical mark at the first spectacle lens and based on at least one of the center axis of the spectacle frame and the center point of the spectacle frame;

adjusting the relative position of the spectacle frame and the marking appliance such that an actuation axis of the marking appliance intersects with the second spectacle lens at the intended position of the second optical mark; and applying the second optical mark to the second spectacle lens at the intended position of the second optical mark with the marking appliance.

2. The method according to claim 1, further comprising: adjusting the relative orientation of the spectacle lens and the marking appliance such that a surface normal of the spectacle lens at the intended position of first or second optical mark overlaps with the actuation axis of the marking appliance prior to applying the first or second optical mark to the spectacle lens, respectively.

3. The method according to claim 1, further comprising: positioning the spectacle frame and the marking appliance relative to each other prior to applying the first optical mark to the first spectacle lens such that the intended position of the first optical mark and the marking appliance are arranged at a predetermined distance along the actuation axis from each other.

4. The method according to claim 1, wherein determining the intended position of the first optical mark based on the spectacle frame includes determining one or more of the following parameters based on the image:

a box dimension of the spectacle frame enclosing the mounted first and second spectacle lenses; and a center point of the first and/or second spectacle lens mounted in the spectacle frame.

5. The method according to claim 4, wherein determining the intended position of the first optical mark is carried out automatically based on the image of at least a part of the spectacle frame and based on one or more of the following parameters:

the box dimension of the spectacle frame enclosing the mounted first spectacle lens; and the center point of the first spectacle lens mounted in the spectacle frame.

6. The method according to claim 1, wherein determining the intended position of the second optical mark at the second spectacle lens based on the spectacle frame includes taking an image of the at least the part of the first spectacle lens including the intended position of the first optical mark and of the at least the part of the spectacle frame surrounding the first spectacle lens and using the image for determining the intended position of the second optical mark.

7. A marking device for applying a first optical mark to a first spectacle lens and a second optical mark to a second spectacle lens mounted in a spectacle frame, the marking device comprising:

a support element for adjustably arranging the spectacle frame in the marking device;

an image capturing unit for capturing an image of at least such parts of the spectacle frame enclosing the first spectacle lens and the second spectacle lens mounted in the spectacle frame;

a marking appliance for applying the first optical mark to the first spectacle lens and a second optical mark to the second spectacle lens at a respective position intersecting with an actuation axis of the marking appliance; and a control unit configured to:

capture the image of the at least parts of the spectacle frame enclosing the first spectacle lens and the second spectacle lens mounted in the spectacle frame with the image capturing unit;

determine an intended position of the first optical mark at the spectacle lens including evaluating the image captured by the image capturing unit;

control the support element to arrange the spectacle frame such that the actuation axis of the marking appliance intersects with the spectacle lens at the intended position of the first optical mark;

determine one or more of the following parameters: a center axis of the spectacle frame and a center point of the spectacle frame;

determine an intended position of the second optical mark at the second spectacle lens based on the position of the first optical mark at the first spectacle lens and based on at least one of the center axis of the spectacle frame and the center point of the spectacle frame; and adjust the relative position of the spectacle frame and the marking appliance such that the actuation axis of the marking appliance intersects with the second spectacle lens at the intended position of the second optical mark.

8. The marking device according to claim 7, wherein the control unit is configured to automatedly determine the intended position of the first and second optical marks at the spectacle lens based on the image of at least a part of the spectacle frame taken by the image capturing unit.

9. The marking device according to claim 7, further comprising:

an alignment light source for emitting an alignment beam for adjusting the relative position and, optionally, a relative orientation of the spectacle frame and the marking appliance.

10. The marking device according to claim 7, wherein the marking appliance comprises at least one of the following elements:

a laser for laser-engraving, a mechanical appliance for mechanical engraving, or a printer unit.

11. A method for applying an optical mark to a spectacle lens mounted in a spectacle frame, the method comprising:

determining an intended position of the optical mark in an automated manner at the spectacle lens based on the spectacle frame including taking an image of at least a part of the spectacle frame and including determining one or more of the following parameters based on the image: a box dimension of the spectacle frame enclosing the mounted spectacle lens and a center point of the spectacle lens mounted in the spectacle frame;

arranging the spectacle frame in a marking device having a marking appliance and adjusting a relative position of the spectacle frame and the marking appliance such that an actuation axis of the marking appliance intersects with the spectacle lens at the intended position of the optical mark; and applying the optical mark to the spectacle lens at the intended position with the marking appliance.

12. The method according to claim 11, further comprising:
adjusting the relative orientation of the spectacle lens and the marking appliance such that a surface normal of the spectacle lens at the intended position of the optical mark overlaps with the actuation axis of the marking appliance prior to applying the optical mark to the spectacle lens.

13. The method according to claim 11, further comprising:
positioning the spectacle frame and the marking appliance relative to each other prior to applying the optical mark to the spectacle lens such that the intended position of the optical mark and the marking appliance are arranged at a predetermined distance along the actuation axis from each other.

14. The method according to claim 11, wherein determining the intended position of the optical mark is carried out automatedly based on the image of at least a part of the spectacle frame and based on one or more of the following parameters: the box dimension of the spectacle frame enclosing the mounted spectacle lens; the center point of the spectacle lens mounted in the spectacle frame.

15. The method according to claim 11, further comprising:
applying a second optical mark to a second spectacle lens mounted in the spectacle frame.

16. The method according to claim 15, wherein applying the second optical mark to the second spectacle lens mounted in the spectacle frame comprises:
determining an intended position of the second optical mark at the second spectacle lens in an automated manner based on the spectacle frame;
adjusting the relative position of the spectacle frame and the marking appliance such that the actuation axis of the marking appliance intersects with the second spectacle lens at the intended position of the second optical mark; and
applying the second optical mark to the second spectacle lens at the intended position of the second optical mark with the marking appliance.

17. The method according to claim 16, wherein the method further comprises:
determining one or more of the following parameters: a center axis of the spectacle frame and a center point of the spectacle frame, and
wherein determining the intended position of the second optical mark at the second spectacle lens is based on the position of the optical mark at the first spectacle lens and the one or more determined parameters.

18. The method according to claim 16, wherein determining the intended position of the second optical mark at the second spectacle lens based on the spectacle frame includes capturing an image of at least a part of the first spectacle lens including the intended position of the first optical mark and of at least a part of the spectacle frame surrounding the first spectacle lens and using the image for determining the intended position of the second optical mark.

19. A method for applying a first optical mark to a first spectacle lens and a second optical mark to a second spectacle lens mounted in a spectacle frame, the method comprising:
determining an intended position of the first optical mark at the first spectacle lens in an automated manner based on the spectacle frame including taking an image of at least a part of the spectacle frame;
arranging the spectacle frame in a marking device having a marking appliance and adjusting the relative position of the spectacle frame and the marking appliance such that an actuation axis of the marking appliance intersects with the first spectacle lens at the intended position of the first optical mark;
applying the first optical mark to the spectacle lens at the intended position with the marking appliance;
applying the second optical mark to a second spectacle lens mounted in the spectacle frame, wherein applying the second optical mark to the second spectacle lens mounted in the spectacle frame comprises:
taking an image of at least a part of the first spectacle lens including the intended and/or actual position of the first optical mark at the first spectacle lens and of at least a part of the spectacle frame surrounding the first spectacle lens;
determining an intended position of the second optical mark at the second spectacle lens in an automated manner using the image of at least a part of the first spectacle lens including the intended and/or actual position of the first optical mark at the first spectacle lens and of at least a part of the spectacle frame surrounding the first spectacle lens;
adjusting the relative position of the spectacle frame and the marking appliance such that an actuation axis of the marking appliance intersects with the second spectacle lens at the intended position of the second optical mark; and
applying the second optical mark to the second spectacle lens at the intended position of the second optical mark with the marking appliance,
wherein determining the intended position of the optical mark based on the spectacle frame includes determining one or more of the following parameters based on the image:
a box dimension of the spectacle frame enclosing the mounted spectacle lens; a center point of the spectacle lens mounted in the spectacle frame.

20. The method according to claim 19, wherein determining the intended position of the optical mark is carried out automatedly based on the image of at least a part of the spectacle frame and based on one or more of the following parameters:
the box dimension of the spectacle frame enclosing the mounted spectacle lens and the center point of the spectacle lens mounted in the spectacle frame.

21. The method according to claim 19, wherein the method further comprises determining one or more of the following parameters:
a center axis of the spectacle frame and a center point of the spectacle frame,
wherein determining the intended position of the second optical mark at the second spectacle lens is based on the position of the first optical mark at the first spectacle lens and the one or more determined parameters.

* * * * *